United States Patent [19]

Daniels et al.

[11] 4,453,048

[45] Jun. 5, 1984

[54] ARRANGEMENT FOR SUBSCRIBER LINE RING TESTING

[75] Inventors: William R. Daniels; John S. Young, both of Scottsdale, Ariz.

[73] Assignee: GTE Automatic Electric Inc., Northlake, Ill.

[21] Appl. No.: 445,801

[22] Filed: Dec. 1, 1982

[51] Int. Cl.³ .............................................. H04M 3/26
[52] U.S. Cl. ...................... 179/175.2 R; 179/175.2 B; 179/175.23
[58] Field of Search ................. 179/175.2 R, 175.2 C, 179/175.2 D, 175.2 B, 175.21, 175.23, 27 FE, 18 AB, 98

[56] References Cited

U.S. PATENT DOCUMENTS 3,752,940 8/1973 Samtulli et al. .............. 179/175.2 R
3,892,928 1/1975 Casterline et al. ........... 179/175.2 R Primary Examiner—Stafford D. Schreyer
Attorney, Agent, or Firm—Charles A. Doktycz; Peter Xiarhos

[57] ABSTRACT

An arrangement for automatically testing a plurality of subscriber lines, which are operationally connected to an electromechanical switching system is shown. Operational service is to be transferred from the electromechanical switching system to a digital switching system. This arrangement provides for automatically verifying whether the digital switching system is applying the proper ringing signal to each subscriber by a comparison with that applied by the electromechanical switching system.

4 Claims, 1 Drawing Figure

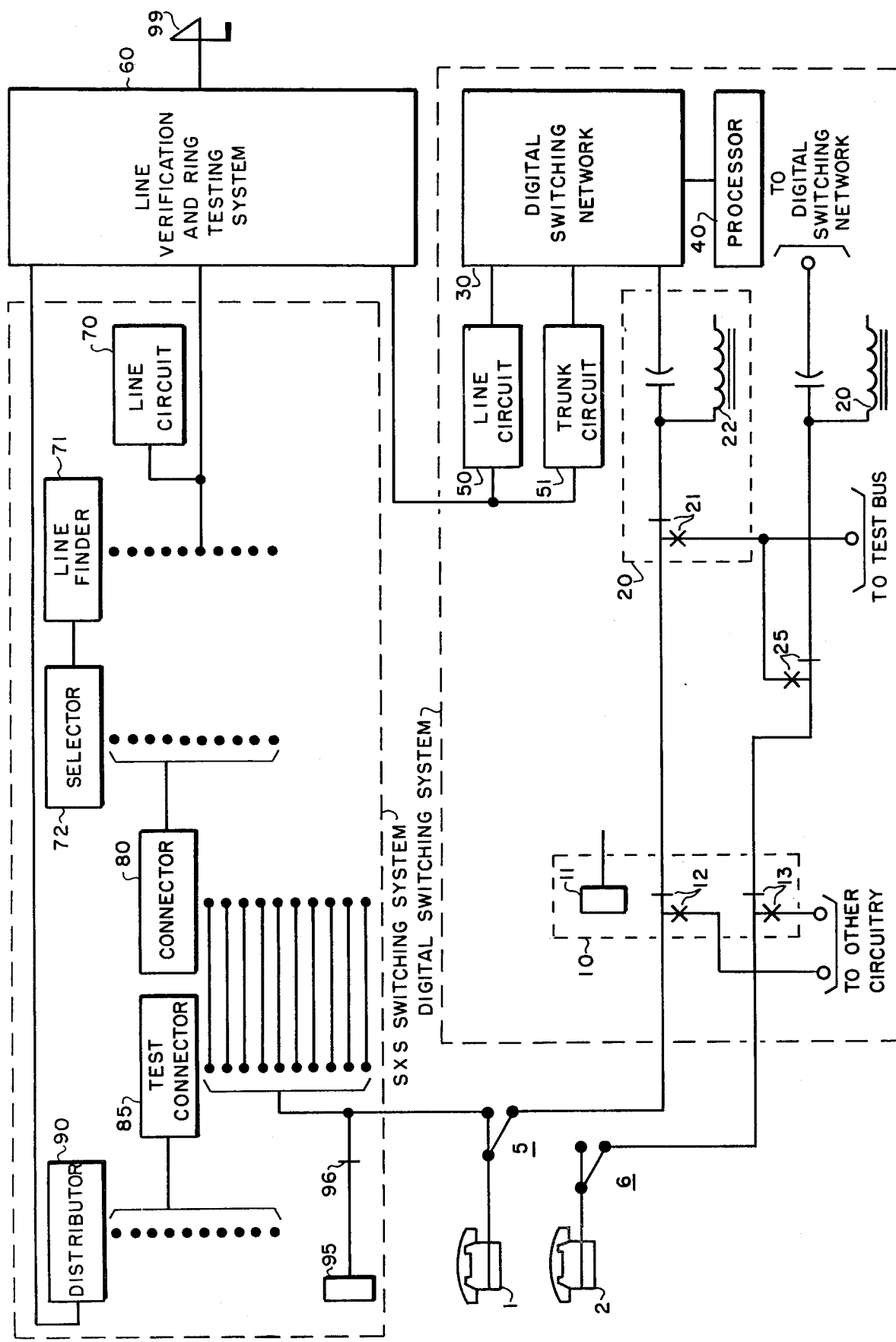

ARRANGEMENT FOR SUBSCRIBER LINE RING TESTING

CROSS-REFERENCE TO RELATED APPLICATIONS

The present application is related to copending U.S. patent application Ser. Nos. 445,803 and 445,802, having the same inventors and being assigned to the same assignee.

BACKGROUND OF THE INVENTION

The present invention pertains to pre-cutover switching system testing and more particularly to an arrangement for an automated testing for the application of the proper ringing signals to the subscriber line.

When a new switching system, such as a GTD-5 EAX, is installed to replace an existing switching system such as a step-by-step system, there is a testing interval during which time the subscriber's cables are double jumpered to both switching systems. That is, each subscriber line will have an appearance on an inlet to each switching system. This double jumpering arrangement is made at the main distribution frame.

Typically, manual procedures were employed to verify a subscriber's line connection prior to cutover of the subscriber's service from one switching system to another. These manual procedures would be as follows: first, an operator initiated a subscriber type access to the untested switching system. Then, the operator sent out the calling number of the subscriber to be verified.

The untested switching system connected the operator to the subscriber and applied the ring signaling. If the subscriber answered the call, the operator would ask whether their connection was audible and noise free and verified that the correct subscriber had been reached. If the subscriber didn't answer, the test must be retried.

These manual procedures are time consuming and uneconomical. Furthermore, the subscriber needs to become involved in the testing operation.

Accordingly, it is the object of the present invention to provide an economical and automated arrangement for subscriber line verification and ring testing which is devoid of subscriber participation or annoyance.

SUMMARY OF THE INVENTION

An arrangement for ring testing in a precutover switching configuration includes a number of switching system subscribers which will ultimately have their operative connection changed from a first switching system to another switching system. At least two switching system subscribers are connected to the first switching system. The first switching system operatively connects these subscribers to one another or to any other switching system subscribers.

The switching system subscribers of the first switching system are simultaneously connected to a second switching system which is in an untested condition. The second switching system includes a switching network connected to the subscribers, and a processor complex is connected to the switching network.

A test switch train is arranged to access to the first subscriber and this test train connection arrangement is operated to connect the first subscriber through the first switching system for a test access.

The regular switch train of the step-by-step exchange is also connected to the first subscriber and is operated to connect any of the switching system subscribers to any other first switching system subscriber.

In this arrangement for subscriber line ring testing the same subscribers are also connected to a second switching system. The second switching system is in an untested condition and is not yet usable for interconnecting said subscribers.

The second switching system has a switching network connected to each of said plurality of subscribers for establishing a connection between these subscribers.

The present arrangement for subscriber line verification and ring testing further includes an automated arrangement for testing, that is connected to the test train of the first switching system and is also connected to the switching network of the second switching system. This automated testing arrangement is operated to request the transmission of a first ringing signal to the first subscriber through the switching network of the second exchange.

The automated arrangement for testing is connected to the first subscriber through the test train connection for this test access. The switching network is responsive to this request from the automated testing unit to generate and to transmit the first ringing signal to the first subscriber. The automated arrangement for testing is then operated to detect this first ring signal via said test access through the first switching system and the testing arrangement is further operated to store an indication of the characteristics of the detected first ring signal.

The automated testing arrangement also connected to the regular connection means for another connection to the first subscriber.

The automated arrangement for testing is then operated to transmit a sequence of directory number signals to the regular connection path but, this sequence of directory number signals is one less than the number of signals required for connecting to the first subscriber.

The testing unit is then operated to transmit a third signal though the test access to the test switch train connection.

The test switch train is operated in response to this third signal to allow connection of the regular switch train to the test connection.

The testing arrangement is then operated to transmit a second signal to the regular connection.

The regular switch train connection is then further operated to transmit a fourth signal having first and second characteristics to the testing arrangement via said test train connection.

The arrangement for testing is operated to detect the fourth signal and the arrangement for testing is further operated to store an indication of the first and second characteristics of the detected fourth signal.

DESCRIPTION OF THE DRAWING

The included drawing FIGURE is a schematic diagram of a pre-cutover, two exchange environment for ring signal testing in accordance with the principles of the present invention.

DESCRIPTION OF THE PREFERRED EMBODIMENT

Referring to the drawing FIGURE, two telephone subscribers 1 and 2 are shown connected to a step-by-step switching system and to a digital switching system. Subscriber 1 is connected to these switching systems via the double jumper connection 5 and subscriber 2 is connected to both switching systems via the double jumper connection 6. A step-by-step switching system is shown, although this invention may be practiced with other electromechanical switching systems as well (e.g. No. 1 EAX, No. 2 EAX, manufactured by GTE Automatic Electric Incorporated or others). The digital switching system is a time switching system such as, the GTD-5 EAX (manufactured by GTE Automatic Electric Incorporated) or other time division switching systems having similar features of other manufacturers.

Both subscribers 1 and 2 are connected to the digital switching system via relay arrangement 10. Relay arrangement 10 includes relay 11 having make-break contacts 12 and 13 which normally provide for simultaneously connecting both subscribers 1 and 2 to switching network 30. Relay 11 may be operated to transfer the connection of subscribers 1 and 2 to other circuitry instead of the switching network 30.

Subscriber 1 is connected through contacts 12 to line circuit 20. Line circuit 20 includes test relay with make-break contacts 21 and battery feed device 22. Contacts 21 are normally closed to maintain subscriber 1 connected to the switching network 30. Contacts 21 may be operated to enable the line of subscriber 1 to be connected to a test bus for maintenance accesses. Similarly, subscriber 2 may be connected to this test bus via the operation of contacts 25.

The digital switching system includes a processor 40, which is operatively connected to digital switching network 30. Line circuit 50 and trunk circuit 51 are connected to the switching network 30 and provide for connecting subscribers 1 and 2 to other subscribers or to other switching systems. Processor 40 includes a CPU arrangement with a memory containing a data base for operating the switching system. This data base enables the digital switching system to associate particular subscribers with particular line circuits and other equipment.

The digital switching system is in the precutover condition, that is not in a fully tested and operative configuration to provide telephone service to the subscribers. The step-by-step switching system is on-line and provides active telephone service to subscribers 1 and 2, until cutover of the digital switching system.

Subscribers 1 and 2 are thus connected via double jumpers 5 and 6 respectively, to the connector bank 80. Quiescent operating potentials are applied to each subscriber's line via a line relay 95 connected in series with the break contact 96 of a cutoff relay. When a subscriber is called, the line relay 95 is disconnected by the operation of the cutoff relay and the line is switched through to a battery feed device of a connector or junctor or other similar circuit.

Line verification and ring testing (LVRT) system 60 is connected to both the step-by-step switching system and to the digital switching system. LVRT 60 is a computer controlled test system which is arranged to provide for a number of line verification and ringing tests of the digital switching system before it is put into active service. These tests include: verifying that the subscriber line is free of shorts, grounds or foreign voltages; verifying that the assigned directory number will reach the same subscriber line from either the step-by-step switching system or the digital switching system; and verifying that the assigned director number will result in the same type of ringing (frequency and particular side of the line) to be applied by the digital switching system as does the step-by-step switching system.

When these functions have been successfully tested on each of the subscriber lines, the digital switching system may be placed into operational service and the step-by-step switching system may be removed from service.

A line verification and ring testing system such as LVT-LRT system, model numbers 730 and 725, manufactured by Porta Systems of Syosset, N.Y., may be equipped to provide the functions as mentioned above.

LVRT system 60 tests the connection from subscriber 1 to the digital switching system. In the preoperational configuration, the digital switching system has operated relay 11 to connect both subscribers 1 and 2 to other circuitry which serves to open circuit subscribers 1 and 2 from the switching network 30.

In order to test the line of subscriber 1 only, a unique path must be established through the digital switching system. The release of relay 11 to its normally open condition will connect both subscribers 1 and 2 to the switching network 30. Since only the line of subscriber 1 is to be tested, processor 40 instructs the digital switching network 30 to operate a test relay having contacts 25 to disconnect subscriber 2 from the switching network and connect the subscriber to the test bus, as if, the access is a test access. At the same time, processor 40 via digital switching network 30 operates relay 11 to its normally closed condition for connecting both subscribers 1 and 2 through contacts 12 and 13 toward the switching network 30. Subscriber 1 is now connected through break contact 12, line circuit 20 to the digital switching network 30. Subscriber 2 is connected via break contact 13 and make contact 25 to the test bus. As a result, subscriber 1 has been isolated from subscriber 2 for testing purposes via the network 30 while at the same time both subscribers 1 and 2 retain an operational access to the step-by-step switching system.

LVRT system 60 initiates a test access to the required subscriber terminal of the step-by-step switching system via an incoming test trunk through distributor 90 and test connector 85. The LVRT system 60 outpulses the directory number of subscriber 1, since this is the line to be tested. The four terminating digits of the directory number are used for this purpose. Upon access to the subscriber 1 terminals of the test connector cutoff relay is operated to operate break contact 96, thereby disconnecting line relay 95 from the connection. LVRT system 60 is now connected to the line subscriber 1 via this metallic test access path. LVRT system 60 connects a self-contained test circuit to the line of subscriber 1 through this metallic test access. This test circuit detects foreign potentials, a ground connection or electrical shorts on the line of subscriber 1. If these tests are unsuccessful, LVRT system 60 initiates a printout on terminal device 99 indicating the failure.

Upon successful completion of the above mentioned tests, LVRT system 60 connects to a line circuit 50 or a trunk circuit 51 of the digital switching system. LVRT system 60 sends out the seven digit or the four digit number of subscriber 1, for an access via a line circuit 50 or a trunk circuit 51, respectively. Special test programs are resident in the memory of processor 40 of the digital switching system. The access of line circuit 50 or trunk circuit 51 by LVRT system 60 will be treated as a special call, that is a call associated with a pre-cutover line test. Processor 40 instructs the digital switching network 30 to operate relay 11 for its normally closed condition and to operate the test relay of make-break contacts 25 to connect subscriber 2 to the test bus and to disconnect subscriber 2 from battery feed device 26.

Battery feed device 22 is connected through contacts 21 and 12 to the line of subscriber 1.

LVRT system 60 connects its detector to the metallic access path previously completed through distributor 90 and test connector 85. This detector determines whether battery feed is applied to the line of subscriber 1 through the step-by-step switching system by the digital switching system.

The battery feed detector should detect 200 ohms to battery on the ring lead of subscriber 1 and 200 ohms to ground on the tip lead. If desired, LVRT system 60 may cause the digital switching system to apply a specific tone for detection through the step-by-step switching system. An unsuccessful detection of battery feed results in a printout on terminal device 99 by LVRT system 60.

For a successful detection of battery feed, LVRT system 60 will transmit a momentary on-hook signal through line circuit 50 or trunk circuit 51 to the digital switching network 30. The test programs of processor 40 interpret this signal as an instruction to apply ringing to the line of subscriber 1. The on-hook signal is applied for a duration of approximately 200 milliseconds. Switching network 30 will cause a ringing signal to be applied to the line of subscriber 1 in accordance with the data base characteristics stored in the memory of processor 40. This ringing will be transmitted through contacts 21 and 12 to the line of subscriber 1. The ringing signal presence is verified by being transmitted via test connector 85 and distributor 90 to the LVRT system 60.

LVRT system 60 connects a ringing sensor to the line of subscriber 1 via the metallic access path through the step-by-step switching system. The ringing sensor determines the type of ringing signal that was applied by the digital switching system. The processor of LVRT system 60 determines whether the proper ringing frequency has been applied and whether it has been applied to the appropriate side of the line (tip or ring lead). The ringing sensor employed by LVRT system 60 is of low impedance, so that it will effectively shunt the telephone instrument of subscriber 1. As a result, subscriber 1 will not detect any annoyance ringing. The detected ringing characteristics will be stored for later comparison.

Next, LVRT system 60 sends an on-hook (disconnect) signal to the switching network 30 through to the line circuit 50 or the trunk circuit 51. Switching network 30 will remove the applied ringing signal and operate relay 11 to disconnect the digital switching system from the line of subscriber 1.

Then, LVRT system 60 outpulses the directory number of subscriber 1 into the step-by-step switching system. Connection to the line of subscriber 1 is established through a regular subscriber access via line circuit 70, line finder 71, selector 72 and connector 80. Normally, connector 80 would find the line of subscriber 1 busy and return busy tone to LVRT system 60, since prior connection has been established via the metallic access path through distributor 90 and test connector 85. To prevent this condition a bridge cutoff condition is established as described below. The bridge cutoff capability is conventionally used to permit operators at a local test desk to connect a line relay to a line under test and thereby initiate a call for service or an "in-test." Such equipment is well known in the telephone art. A typical system is described in Automatic Electric Company Bulletin 815, titled "The Test and Verification Switch Train." Before LVRT system 60 dials the last digit of subscriber 1, the bridge cutoff is operated removing busy guard from the connector 80. Connector 80 will find the line of subscriber 1 idle and extend ringing to the line.

Since a ringing sensor is connected to the line of subscriber 1 through distributor 90 and test connector 85, the ringing signal is returned to LVRT system 60. The ringing frequency and its application to a particular side of the line will be detected and recorded as mentioned above.

LVRT system 60 may cause the ringing information of both the digital switching system and the step-by-step switching system to simply be printed on terminal device 99. LVRT system 60 may alternatively compare the ringing characteristics of each switching system and print any discrepancy on terminal device 99. LVRT system 60 disconnects all accesses to the step-by-step switching system and digital switching systems. Line verification and ring testing of the line of subscriber 1 is completed and similar testing of each of the other subscriber lines, to be cut over into service on the digital switching system, may proceed.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a pre-cutover switching configuration, an arrangement for subscriber line verification and ring testing comprising:
 a plurality of switching system subscribers;
 a first switching system connected to said plurality of switching system subscribers, said first switching system operated to connect any of said switching system subscribers to other switching system subscribers, said first switching system comprising:
  said plurality of switching system subscribers including at least a first subscriber operatively connected to said first switching system for said connection to other switching system subscribers; and
  test connection means connected to said first subscriber and said test connection means operated to connect said first subscriber through said first switching system for a test access;
  regular connection means connected to said first subscriber and operated to connect any of said switching system subscribers to said first switching system subscriber;
 said arrangement for subscriber line verification and ring testing further comprising:
 a second switching system connected to said plurality of switching system subscribers, said second switching system being in an untested condition for connecting said subscribers, said second switching system comprising:
  said first subscriber connected to said second switching system; and
  a switching network connected to each of said plurality of subscribers for establishing a connection between at least two of said subscribers;
 said arrangement for subscriber line verification and ring testing further comprising:
 means for testing connected to said test connection means of said first switching system and connected to said switching network of said second switching system, said means for testing operated to request transmission of a first signal to said first subscriber via said switching network;

said means for testing connected to said first subscriber via said test connection means for said test access;

said switching network responsive to said request of said means for testing to generate and to transmit said first signal to said first subscriber;

said means for testing operated to detect said first signal via said test access through said first switching system and said means for testing further operated to store an indication of first and second characteristics of said detected first signal;

said means for testing connected to said regular connection means for connecting to said first subscriber;

said means for testing operated to transmit a sequence of second signals to said regular connection means, said sequence of second signals including a number of second signals being one less than the number of signals for connecting to said first subscriber;

said means for testing operated to transmit a third signal via said test access to said test connection means;

said test connection means operated in response to said third signal to allow connection of said regular connection means to said test connection;

said means for testing operated to transmit a second signal to said regular connection means;

said regular connection means further operated to transmit a fourth signal having first and second characteristics to said means for testing via said test connection means;

said means for testing operated to detect said fourth signal and said means for testing further operated to store an indication of said first and second characteristics of said detected fourth signal.

2. In a pre-cutover switching configuration as claimed in claim 1 further including printout terminal means operated upon storage of said detected first and fourth signal data to produce a printout thereof.

3. In a pre-cutover switching configuration as claimed in claim 1 further including a comparison means in said means for testing operated after said operation to store an indication of said first and second characteristic of said detected fourth signal to compare said data with said stored indication of said first and second characteristic of said earlier detected first signal, and thereafter further operated to store an indication of the results of said comparison.

4. In a pre-cutover switching configuration as claimed in claim 3 further including printout terminal means operated upon storage of said indication of said comparison to produce a printout thereof.

* * * * *